United States Patent [19]

Vannier et al.

[11] Patent Number: 4,636,956

[45] Date of Patent: Jan. 13, 1987

[54] METHOD AND DEVICE FOR OPTIMIZATION OF SEISMIC DATA

[75] Inventors: Serge Vannier, Saint-Gaudens; Robert Garotta, Chatenay-Malabry; André Lozes; Jean C. Vidal, both of Saint-Gaudens, all of France

[73] Assignees: Societe Nationale Elf Aquitaine (Production), Courbevoie; Compagnie Generale de Geophysique, Massy, both of France

[21] Appl. No.: 591,571

[22] Filed: Mar. 20, 1984

[30] Foreign Application Priority Data

Mar. 23, 1983 [FR] France ............................... 83 04740

[51] Int. Cl.$^4$ .......................... G01V 1/20; G01V 1/36
[52] U.S. Cl. ..................................... 364/421; 367/59; 367/56
[58] Field of Search ....................... 367/56, 59, 48, 40, 367/100, 39; 364/421

[56] References Cited

U.S. PATENT DOCUMENTS

| | | | |
|---|---|---|---|
| 3,638,175 | 1/1972 | Stone | 367/48 |
| 3,681,749 | 8/1972 | Ferree et al. | 5/247 |
| 3,786,409 | 1/1974 | Sorkin | 367/59 |
| 4,069,471 | 1/1978 | Silverman | 367/40 |
| 4,101,867 | 7/1978 | Martin | 367/54 |
| 4,104,611 | 8/1978 | Kalden | 367/48 |
| 4,346,461 | 8/1982 | Muip | 364/421 |
| 4,498,157 | 5/1985 | Martin et al. | 367/56 |

FOREIGN PATENT DOCUMENTS 1379460 1/1975 United Kingdom .

*Primary Examiner*—Jerry Smith
*Assistant Examiner*—Kimthanh Tbui
*Attorney, Agent, or Firm*—Schwartz, Jeffery, Schwaab, Mack, Blumenthal & Evans

[57] ABSTRACT

In a method and device for the study of surface layers and subjacent layers of interest, the device comprises receivers and at least two transmission sources spaced at a distance such that a set of traces produced by one of the transmission sources does not interfere with a set of traces produced by the other transmission source when the two sets of traces are on the same time-section.

24 Claims, 5 Drawing Figures

FIG_4

METHOD AND DEVICE FOR OPTIMIZATION OF SEISMIC DATA

This invention relates to a method and a device for optimization of seismic data and more particularly for better simultaneous and selective acquisition, of data relating to an earth layer located near the earth's surface and data relating to deeper layers.

In terrestrial seismic prospecting, one or a number of sending transducers or transmitters are placed on or near the land surface in order to transmit a signal which is propagated within the medium to be explored. One or a number of receiving transducers or receivers also placed at or near the surface serve to receive and record transmitted waves after they have been reflected from different reflectors of the medium to be explored. In fact, part of the signal is propagated through different rock formations and is reflected from the interfaces between the layers which have different seismic characteristics. The waves thus reflected produce what is known as a seismogram or more usually a set of traces. A trace represents the time of outward and return travel of the seismic energy which is propagated within the medium to be explored and is reflected back from the reflectors.

The traces recorded on the receivers which are spaced at a distance designated as the inter-trace interval (by analogy with the distance between two consecutive transmitters or so-called inter-source distance) make it possible to obtain information relating to the rock strata of the medium to be explored. By reason of the time of transmission of the emitted signal and the listening time required between emission of waves within the medium and arrival at the receivers, it is necessary to position or lock the traces with respect to each other as otherwise the record containing all or part of the recorded traces would not be interpretable.

Furthermore, it is absolutely necessary to make certain corrections before preparing a certain number of records such as the so-called "time-section" record. However, there are many difficulties to be overcome.

The first difficulty lies in the fact that the rock layers of the medium to be explored have different seismic characters. Among these rock layers, the first is very important. This first layer is a surface or weathered layer designated as the "weathering zone" (WZ). The velocity characteristic, for example, must also be known as accurately as possible since it is this characteristic which will determine the so-called static correction. It is in fact necessary to make this correction in the traces in order to remove any undesirable effects which may be produced by the WZ layer. This layer will hereinafter be designated as the surface layer. The static correction relating to said surface layer is therefore intended to restore the times of the successive traces and consequently the shape of the indicatrices on the time-section record to what they would have been if the surface layer had not existed or, more precisely, if the layers subjacent to the surface layer had existed up to the surface of the ground, which is assumed to be horizontal.

Geophysicists are aware of the importance of this correction which usually follows another so-called dynamic correction, the object of which is to obtain a trace which would have been obtained directly in the field if the transmitter-receivers had been positioned at the same point of the land surface. As a general rule, the velocity of the wave which travels through the surface layer is considerably lower than that of waves which travel through the subjacent layers. Among other factors, the determination of this velocity characteristic is essential. It is for this reason that up to the present time there has never been any hesitation over the need to perform specific measurements of the surface layer and therefore to make use of considerable means in order to achieve the desired result. One of these means consists in drilling a borehole, in firing an explosive charge placed at the bottom of the borehole, in recording the shock waves generated in the ground by the explosion and then processing the recordings.

Other known methods consist in employing the indicatrices by plotting the first arrivals on the time-section record, then in determining the time correction factor by cross correlation of the traces with respect to each other. Static correction methods of this type are described in U.S. Pat. No 4,069,471. Other methods are described in U.S. Pat. Nos. 3,681,749 and 4,101,867 as well as in British Pat. No 1,379,460.

However, the methods and devices described in these patents make direct use of the indicatrices by endeavoring to extract the information relating to the surface layer or suggest the use of entirely independent devices which are specific to the surface layer.

Irrespective of the method employed, it is necessary to separate the measurements relating to the weathered surface layer from those relating to the rock layers of interest. In fact, the seismic tape records obtained do not permit a direct study of the weathered surface layer by reason of the fact that, up to approximately 600 ms, the interference produced by said weathered layer on the tape records is too great to permit valid information to be obtained from these records. In consequence, the need to perform separate measurements imposes a heavy cost penalty.

The aim of the present invention is to propose a method and a device for seismic prospecting which make it possible in a single path of travel to obtain seismic tape records which contain both data relating to the surface layer and data relating to the deep layers.

A further object of the present invention is to collect all the data in a single path of travel and to achieve what is referred-to by geophysicists as high resolution by means of a better determination of the characteristics of the surface layers. This is achieved by virtue of the fact that the present invention makes it possible to dissociate the data relating to the surface layers from those relating to the subjacent layers of interest and thus to attenuate surface layer filtering effects to the maximum extent as a result of better determination. It is worthy of note that the same receiving means are employed both for the purpose of collecting the data relating to the surface layers and for the purpose of collecting the data relating to the subjacent layers.

These aims are achieved by the method in accordance with the present invention, wherein a first long signal which scans a predetermined spectrum of frequencies is transmitted on an exploration path from at least one first transmission source and wherein a second signal is transmitted from a second transmission source which is separate from and synchronous with the first source, the energies emitted by the two transmission sources being different. The method further consists in making use of means for receiving the waves which are produced by said signals and are propagated in the medium to be explored, and in making records of the waves which arrive at said receiving means.

One feature of the method lies in the fact that the polarity of the signal emitted by the first transmission source is reversed at each transmission whilst the polarity of said signal which is produced by the second transmission source is maintained constant.

Another feature lies in the fact that the recordings corresponding to the first transmission source are grouped together in pairs, the two recordings of each pair being constituted by two signals of reverse polarity in order to form a first group of pairs of recordings.

In accordance with another feature, the recordings produced by the second transmission source are also grouped together in pairs in order to constitute a second group of recordings and each pair of the second group corresponds in transmission time to a single pair of recordings of the first group.

In accordance with a further feature, the method consists in processing the two groups of recordings as a function of optimization of the data relating to each transmission source. The process for optimization of the data of the second transmission source is carried out by addition of the pairs of recordings of the first group and by addition of the pairs of recordings of the second group. The process for optimization of the data of the first transmission source consists in reversing the polarity in the recordings of the signals of the first group of recordings, said polarity being opposite to the fixed polarity of the signals of the second group. The process then consists in forming the sum of recordings within each of the groups aforesaid.

Finally, the method also consists in cross correlating the result of each addition aforesaid with the common signal produced by each transmission source aforesaid.

Thus, depending on whether the results of the first sending transducer or of the second sending transducer are optimized, preference is accordingly given to the data relating to the surface layer or to the data relating to the subjacent rock layers of interest. Furthermore, the data obtained are very clear and therefore more readily interpretable.

Moreover, the fact of utilizing a single array of receivers suppresses distortions arising from the use of different receivers.

In accordance with another distinctive feature of the invention, the first sending transducer is constituted by a group of three transmitters which produce in synchronism a single transmission signal whilst the second sending transducer consists of a fourth single transmitter placed at a relatively long distance from the group of three transmitters. In fact, the distance between the three transmitters and the fourth transmitter will be a function of the noise cone which is specific to the surface layer of the medium to be explored.

Other features of the invention will be more apparent upon consideration of the following description and accompanying drawings, wherein.

Figure 1:
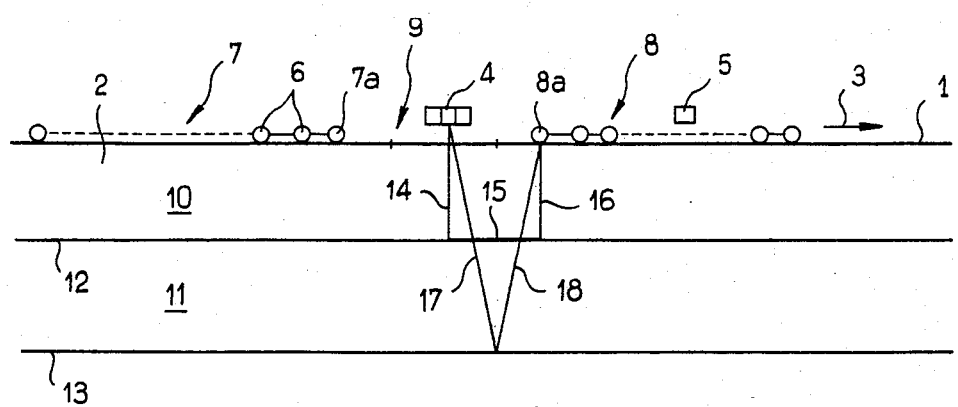
FIG. 1 is a partial schematic diagram of a geophysical prospection arrangement representing the locations of the transmitters with respect to the receivers.

Part of the exploration device is placed on the land surface 1 of the medium 2 to be explored and along an exploration path indicated by an arrow 3. It should be pointed out that the other elements of the device, although necessary for processing the data collected by the device, have not been shown in the drawings since they are well-known to those skilled in the art. Similarly, the device moves on the exploration path in the direction of the arrow 3 but is also capable of displacement in the opposite direction.

The device comprises a first transmission source consisting of three synchronous transmitters 4 of the vibrator type such as those employed in the known method designated as "Vibroseis". A second transmission source 5 which is separate from the first is also constituted by a transmitter of the vibrator type which is similar to or identical with the transmitters 4. The transmitter 5 is synchronous with the transmitters 4 and located at a predetermined distance from said transmitters 4. In order to ensure that all the transmitters 4 and 5 are in fact synchronous, it is preferable to carry out synchronization tests at the start of each series of transmissions as is the customary practice when synchronous transmitters are employed in seismic prospection.

The device further comprises receiving means consisting of aligned receivers 6 in uniformly spaced relation. In the example shown in FIG. 1, the receivers are arranged in two lines 7 and 8 of forty-eight receivers per line with a window 9 between the two adjacent ends 7a and 8a of said lines. It is readily apparent that, instead of forty-eight receivers disposed in each line 7 or 8, it would be possible to employ four parallel lines each consisting of twelve receivers in order to have a coverage of forty-eight receivers in each of the lines 7 or 8. In this case, the transmitters would be located at the center of the receiving device and the transmitter 5 would be aligned with the receivers. It should be mentioned that all the arrangements described with reference to FIG. 1 will remain applicable to the parallel lines. In the example illustrated, the window or the distance between the receivers 7a and 8a is of the order of 450 meters and is in any case considerably greater than the distance between two consecutive receivers 6, namely a distance of 50 meters in the case of tests which have actually been performed.

At the first transmission point, the synchronous transmitters 4 and 5 transmit a single signal having a time-duration of 26 seconds and a frequency spectrum within the range of 12 to 70 Hz. By way of example, the signals produced by the transmitters 4 and 5 can have a positive polarity. The waves produced by said vibrational signals pass through a surface layer 10 and the rock layers of interest, only one of which is shown in FIG. 1, namely the layer 11. The layers 10 and 11 are separated by an interface 12 whilst the rock layers are separated by an interface 13 which is usually considered as substantially flat with the exception of dips. The waves within the layer 10 follow a vertical theoretical path 14 down to the interface 12, then a horizontal path 15, then again a vertical path 16 before being received by the receivers 8. In the layer 11, the waves are reflected from the interface or reflector 13 before being received by the receivers 6, the path followed by the waves being indicated by the references 17 and 18.

Figure 2:
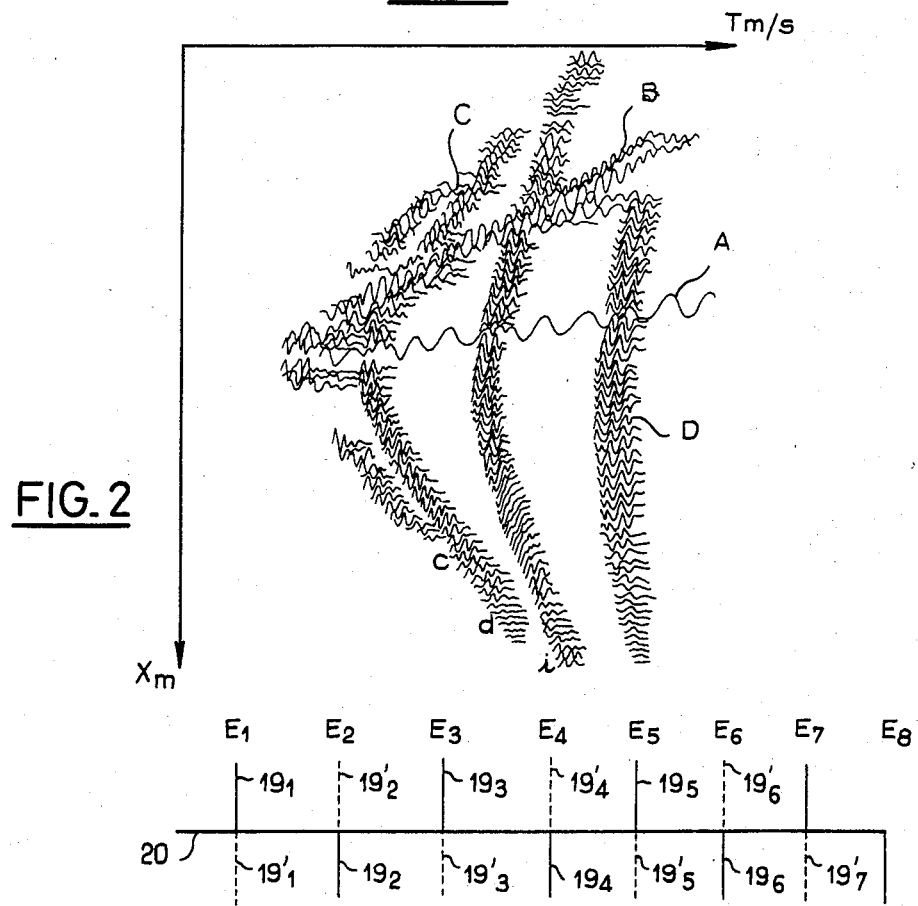
FIG. 2 is a synthetic record which can be obtained in accordance with one of the methods of the prior art.

In each receiver 8, the received signals correspond to the different wave paths within the medium to be explored and the recording of these received signals constitutes a trace. The first arrival on the trace corresponds to noise or a stray signal propagated within the layer 10 along the path 14, 15, 16 whilst the other successive arrivals correspond to paths such as 17 and 18 after reflection from the successive reflectors. Thus signals produced by refraction from the interface 12 and by reflection from the interface 13 will be recorded in each trace. After processing, the set of traces results in a record of the type shown in FIG. 2. On this record, certain corrections have been made on the traces and the lower portion of the record shows that, as the distance from the wave emission point or shot point increases, so the starting portion of the traces at g, d becomes less distinct with a progressively smaller amplitude. It is further apparent that, beyond a certain distance d, i, the starting portions of the traces become unreadable and merge completely with the secondary arrivals.

In the upper portion of the record, if the aerial wave A is disregarded, it can be very clearly seen that the record is disturbed by another transverse noise component B or so-called ground roll and that the traces are deformed at C by the effects of the layer 10 in particular. It is only at the level of the deeper reflectors D that the amplitude of the signals on the traces becomes greater. It may be deduced from the synthetic record shown in FIG. 2 that, when making use of a conventional device, the data will always be impaired by noises of all types and by the effects of the weathered layer or surface layer 10 whilst the useful and significant data begin at approximately 1200 ms.

In accordance with the present invention, the method consists in making use of two separate energy transmission sources, the ratio of energies transmitted being different from 1. It is for this reason that the first transmission source comprises three transmitters as designated by the common reference 4 whilst the second source comprises only a single transmitter as designated by the reference 5.

Figure 3:
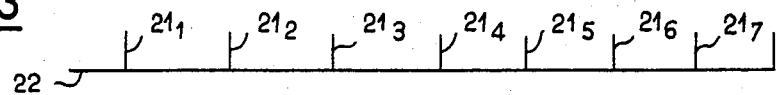
FIG. 3 is a schematic diagram of the polarity of the signals produced at the different transmission points.

In a simplified form of the method in accordance with the invention and with reference to FIG. 3, the polarity of the signals emitted by the transmitters 4 is indicated by full-line segments $19_1$ to $19_8$ which are disposed vertically on a line 20. The polarity of the signals emitted by the transmitter 5 is indicated by full-line segments $21_1$ to $21_7$ disposed vertically on a line 22. The two lines 20 and 22 have no significance but have been placed one above the other for the sake of enhanced clarity of the description whilst the difference in height between the lines 19 and 20 mean only that the energies transmitted are different.

At the emission point $E_1$, the transmitters 4 and 5 each emit a signal $19_1$ and $21_1$ of positive polarity. At the following emission point $E_2$, the polarity of the signals emitted by the transmitters 4 is reversed as indicated by the full-line segment $19_2$ whilst the transmitter 5 emits the same signal $21_2$ but which has a positive polarity. At the emission point $E_3$, the polarity of the signals emitted by the transmitters 4 is again alternated while retaining the same positive polarity, in the case of the signals of the transmitter 5. The alternating operation is resumed until the last emission point $E_8$, for example. By way of illustration, the emission points $E_1$ to $E_8$ may be spaced at a distance of 8.33 m. The signals received by the receivers 8 are recorded and processing is performed as a function of the desired optimization.

Irrespective of the optimization which may be desired, the processing operation comprises correlation steps which consist in correlating each transmitted signal with the corresponding received signal and in recording the result of these correlations on tape.

In accordance with the invention and in the case of optimization relating to the transmitter 5, for example, the correlated recordings of the transmitters 4 are grouped together in pairs so that each pair thus has a positive-polarity signal $19_1$ and a negative-polarity signal $19_2$. Similarly, the correlated recordings of the transmitter 5 are grouped in pairs. Thus the pair $21_1$ and $21_2$ will correspond to the pair $19_1$ and $19_2$. The different pairs $19_1$ and $19_2$, $19_3$ and $19_4$, $19_5$ and $19_6$ are added to each other, the result of the addition being substantially or nearly zero by reason of the reverse polarities of the transmitted signals. The different pairs $21_1$ and $21_2$, $21_3$ and $21_4$, $21_5$ and $21_6$ are also added to each other, the result of this addition being largely positive since the polarity of the signals is the same. These two addition results are correlated with the transmitted signal in order to refine the final signature.

From the foregoing, optimization of data relating to the transmitters 4 can readily be conceived. In fact, in the first group of recordings $19_1$ to $19_6$, the polarity of the even-numbered signals or odd-numbered signals is reversed according to the polarity which is chosen. For example, if it is desired to have an upwardly directed result of addition, the polarity of the even-numbered signals such as $19_2$, $19_4$ and $19_6$ is reversed. In the second group of recordings $21_1$ to $21_6$, the polarity of the even-numbered or odd-numbered signals is reversed. The operations of addition and cross correlation are carried out as before in order to give distinct preference to the data relating to the transmitters 4 with respect to those relating to the transmitter 5 in which the result of addition of the signals is zero or nearly zero.

In another embodiment of the method according to the invention, the transmitters 4 emit twice at each emission location $E_1$ to $E_8$, namely a first time with a signal of positive polarity $19_1$, for example, and the second time with the same signal but of negative polarity such as the signal $19'_1$. At the same time as the transmitters 4, the transmitter 5 emits a signal which is of the same frequency but always of different energy than the signal from transmitters 4 and has constant polarity which may be positive, for example, namely the signals $21_1$ to $21_7$ of FIG. 3.

Figure 4:
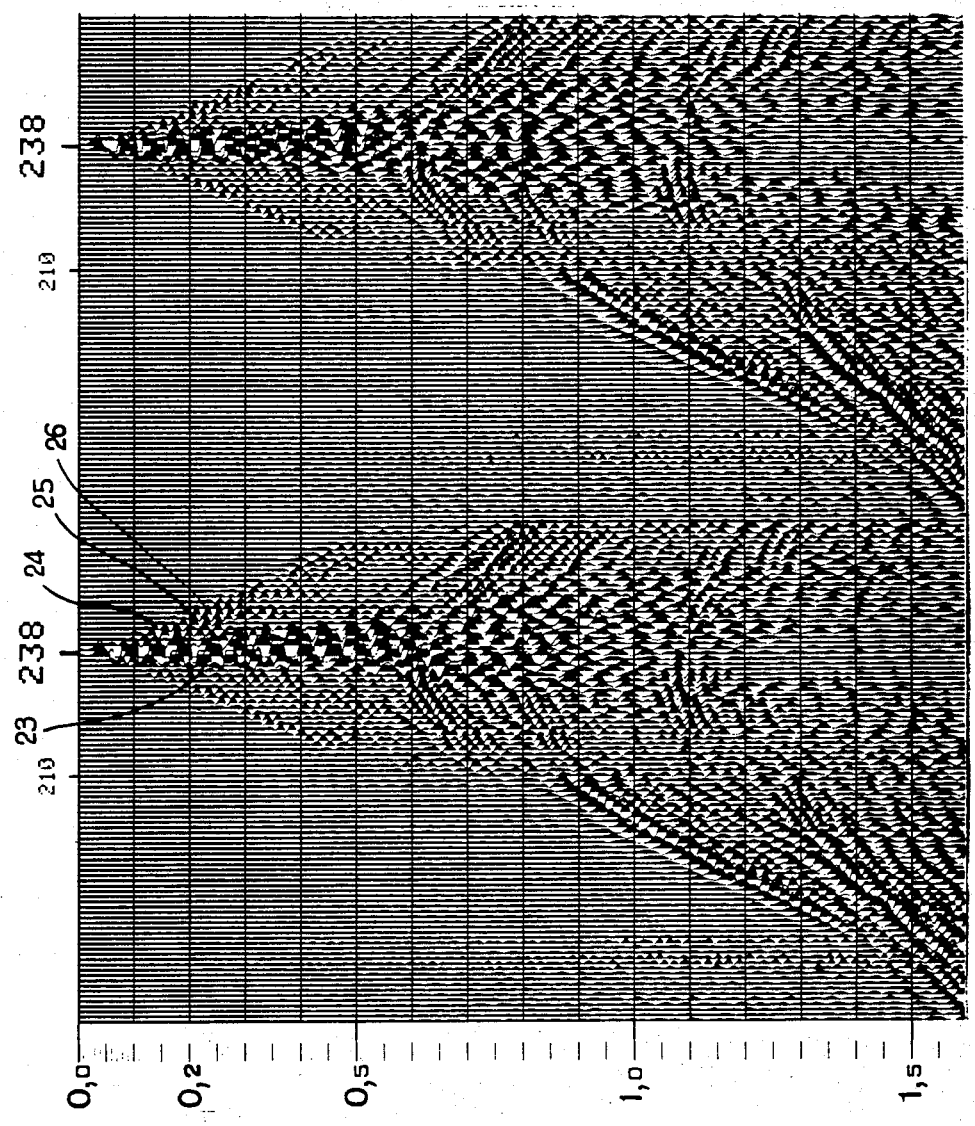
FIG. 4 is a seismic tape record obtained in accordance with the invention and relating to the surface layer.
Figure 5:
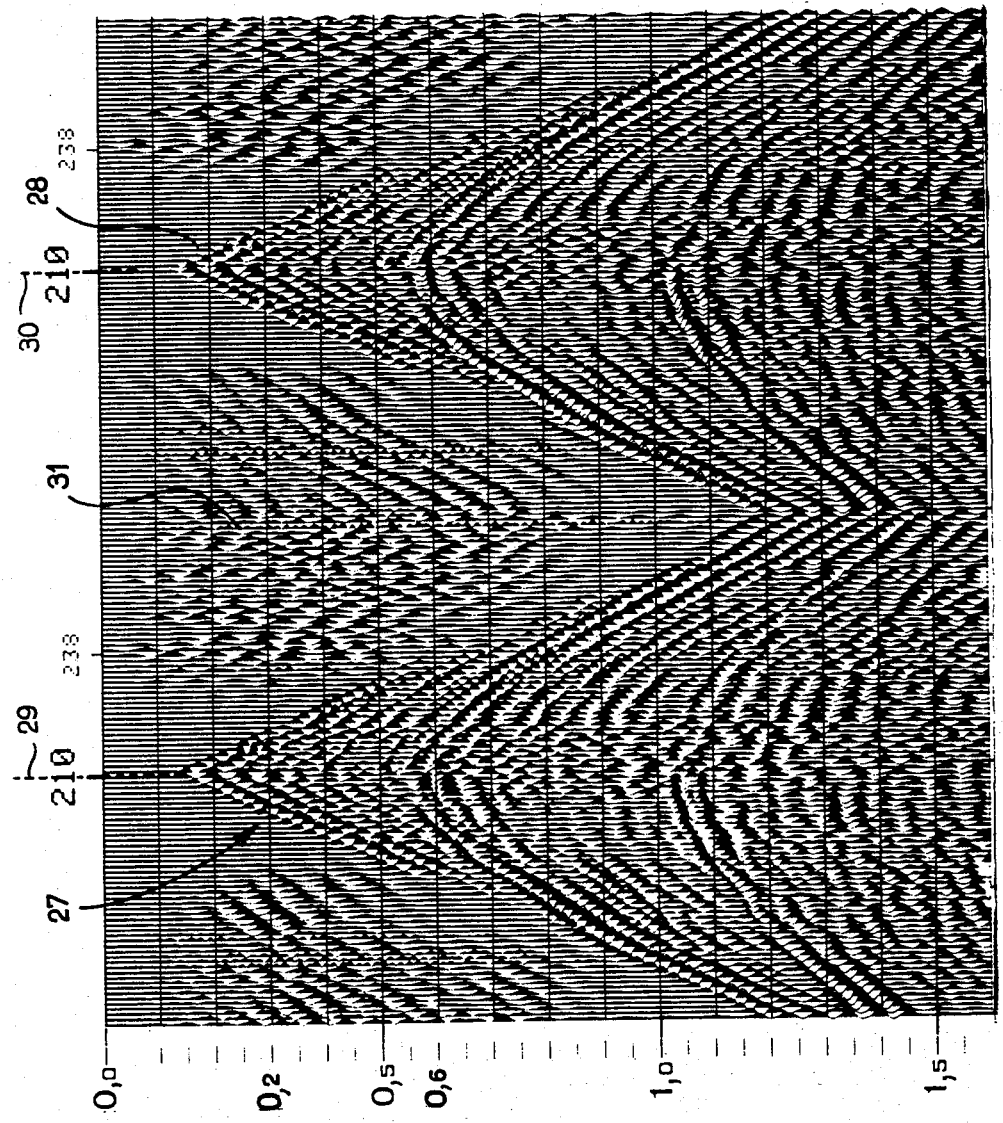
FIG. 5 is a seismic tape record relating to the layers which are subjacent to the surface layer.

Addition and correlation of the recordings of the two groups produce seismic records such as those shown in FIGS. 4 and 5.

The time values in seconds have been plotted as ordinates and the emission points have been plotted as abscissae. The reference 210 designates an emission point of the transmitters 4 whilst the reference 238 designates an emission point of the transmitter 5.

The seismic record of FIG. 4 corresponds to optimization of data relating to the transmitter 5. In accordance with the invention, the function of this transmitter is to collect the maximum amount of information on the surface layer since, by definition, the transmitter 5 has an energy level which is distinctly lower than that produced by the transmitters 4.

In this specific case, the record is the result of two transmissions of the transmitter 5 at the emission point 238 but the discussion will be limited to only one correlation product, namely the left-hand product, for example.

This record clearly shows a noise cone 23 located at the center and having a small angle at the vertex. The first traces 24 located between 0 and 200 ms are highly disturbed by the transmitter 5. But after 200 ms, small reflections 25, 26 having a high-frequency character can be observed., These reflections occurred in the first soil strata of the surface layer 10 which were located well above the interface 12. These small reflections which are clearly visible on the seismic record of FIG. 4 are distinctly clearer than on the seismic record of FIG. 5 as will be explained hereinafter.

When consideration is given to the influence of the signals emitted by the transmitters 4 at the emission point 210, it is found that, up to about 600 ms, the seismic record of FIG. 4 exhibits little disturbance.

Accordingly, the first useful reflectors of the surface layer 10 will serve to determine the surface horizons of said surface layer, particularly by resorting to the well-shooting technique. This technique is employed in terrains in which the rock layers do not have a constant structure or give rise to variations in velocity. In consequence, it will be possible to "pick up" a surface horizon in a time interval which will be fixed by well-shooting at a depth horizon. Stated differently, this means that, from a knowledge of the velocity of propagation within the surface layer 10 gained as a result of the well-shooting operation and also the position of the first reflectors 25, 26, it is possible to determine the depth of said reflectors 25, 26.

This better localization of the first reflectors 25, 26 makes it possible to reduce the surface layer and to give a static correction value to be applied to the deep layers. This makes it possible to bring back these layers to the same horizontal plane and to eliminate variations in time at the deep horizons which would be due only to slowing-down of the seismic waves in the surface layer.

Referring now to FIG. 5, this seismic record can also be seen to consist of two portions. One portion 27 corresponds to emission of the signals at the emission point 210 and to addition and correlation of recordings of the corresponding signals which all have the same negative polarity, for example. The other portion 28 corresponds to emission of the same signals at the same emission point 210 with addition and correlation of signals which all have a positive polarity. This is clearly visible in FIG. 5. Thus, when following the 200 ms line, it is observed that the portion 27 is black at the intersection of the vertical line 29 which passes through the point 210 with the 200 ms horizontal line. On the other hand, the portion 28 is white at the intersection of a vertical line 30 which passes through the emission point 210 with the 200 ms horizontal line.

At the emission point 238, these two portions 27 and 28 remain practically unchanged by the transmitter 5, the effects of which are localized between said portions 27 and 28 and represented by a noise 31.

A study of the seismic record of FIG. 5 shows that nothing can be analyzed between 0 and 150 ms and that the first reflectors or deep horizons are located at approximately 600 ms. Between 150 and 600 ms, the record cannot readily be interpreted since this is clearly a case of organized noise, of small reflections or of any other event which does not make it possible to determine whether it is of interest or not. However, by virtue of the quality of the seismic record obtained in accordance with the present invention, there is every reason to assert that the deep horizons of interest start at 500 ms whereas it is apparent in FIG. 1 that these deep horizons start only in the vicinity of 700 ms. It is further apparent from a comparison of the two seismic records of FIGS. 1 and 5 that the attenuations are much smaller and that, between 1 s and 1.5 s, the seismic record of FIG. 5 can still be utilized for clearly exhibiting an event at 1.05 s.

It is thus possible to combine in one and the same path of travel the data collected in FIG. 4 and relating to the surface layer 10 and the data collected in FIG. 5 and relating to the deep horizons. This possibility not only permits recordings up to the front of the surface layer 10 as close as possible to the land surface 1 but also permits determination of the static correction to be made on the different traces in order to obtain a usable record.

The examples given with reference to FIGS. 1 to 5 relate either to one emission from the transmitters 4 and 5 at each emission point $E_1$ to $E_8$ or to two emissions from the transmitters 4 and one emission from the transmitter 5 at each emission point. In both cases, the lead pitch of the device is 8.66 m which is the constant spacing between two emission points E to $E_8$.

It would also be possible to consider another way of displacing the device without making any change in the method in accordance with the invention. Accordingly, satisfactory tests have been performed with the following parameters:

TEST 1 a. Three transmitters 4 with alternate polarization.
b. Time of transmission of each signal emitted by the transmitters 4: 26 s.
c. Frequency band of the signal emitted by each transmitter 4: 12–70 Hz.
d. Six emission points $E_1$ to $E_6$ having a relative spacing of 8.33 m.
e. One emission of the transmitters 4 at each emission point.
f. A transmitter 5 having locked polarization and placed at a distance of 1400 m from the transmitters 4.
g. Time of transmission of the signal emitted by the transmitter 5: 26 s.
h. Frequency band of the signal emitted by the transmitter 5: 12–70 Hz.
i. Device consisting of 96 receivers having a relative spacing of 50 m with a window 9 at the center of 450 m, and a total recording time of 26 s+5 s.
j. Two emissions of the transmitter 5 at each emission point but by displacing said transmitter 5 by 16.66 m between two successive emissions.

In this case, there is observed a slight improvement in the initial portions of the recordings in the immediate vicinity of the transmitter 5 on normal exploitation records, the removal of organized noises clearly takes place more efficiently by subtraction at one and the same emission point.

TEST 2

The same parameters as Test 1 are again employed but by modifying b and g which are respectively 16 s and 4 s plus the 5 s of listening time.

Decoupling of these transmission times added to the composition effects produces even better results. The seismic record relating to deep horizons contains practically no phenomena which are similar to those designated by the reference 31 in FIG. 5 and produced by the transmitter 5.

TEST 3

The parameters b, c, d, g, h, i are employed together with the following new parameters:

a. Three transmitters 4 with blocked negative polarization.
e. Two emissions of the transmitters 4 at each emission point.
f. An alternate polarization transmitter 5 placed at a distance of 1400 m from the transmitters 4.
j. Two emissions of the transmitter 5 at each emission point but by displacing said transmitter 5 by one pitch of 8.33 m between two emission points.

The result thereby achieved is that a seismic record relating to the transmitter 5 is of excellent quality.

As will readily be apparent, the invention is not limited in any sense to the exemplified embodiment described with reference to the accompanying drawings. From this it follows that, depending on the applications which may be contemplated, it will be possible to consider many alternative forms within the capacity of any one versed in the art without thereby departing either from the scope or the spirit of the invention.

What is claimed is:

1. A method of optimization of seismic data during exploration of a medium, comprising:
   emitting from at least a first transmission source a first series of first long signals having alternating polarities and containing a predetermined frequency spectrum;
   emitting at the same instant, from at least one second transmission source which is separate and distinct from the first source a second series of second signals having a constant polarity and having energy levels different from the energy levels of said first signals;
   receiving and recording both series of signals after propagation through the medium to be explored;
   grouping into pairs recorded signals of said first series having opposite polarities;
   grouping into pairs recorded signals of said second series having the same polarity as each other and corresponding in transmission time, respectively, to signals in pairs of said first group;
   adding the pairs of said first group;
   adding the pairs of said second group; and
   cross correlating the sums produced by each addition with the signal emitted by the corresponding transmission source.

2. A method according to claim 1, wherein the first transmission source comprises at least two synchronous transmitters.

3. A method according to claim 1 in which the receiving step is carried out by a plurality of uniformly spaced receivers and said emitting steps are carried out at a plurality of emission points, said receivers being displaced together from one emission point to another emission point, said emission points being spaced at a constant pitch on the exploration path, wherein said receivers are disposed in at least two separate lines which form extensions of each other but the adjacent ends of which are separated by an interval which is greater than the distance between two consecutive receivers.

4. A method according to claim 3, wherein the distance between the transmission sources is considerably greater than the distance between two consecutive receivers.

5. A method according to claim 3, wherein the second transmission source is displaced between two of its consecutive transmissions by a distance equal to two pitches.

6. A method according to claim 5 wherein, at each emission point, the second transmission source emits the same signal twice in succession.

7. A method according to claim 3 wherein, at each emission point, each source transmits twice in succession.

8. A method according to claim 1, wherein the time-duration of the signal emitted by the first source is equal to the time-duration of the signal emitted by the second source.

9. A method according to claim 1, wherein the time-duration of the signal emitted by the first source is longer than the time-duration of the signal emitted by the second source.

10. A method according to claim 9, wherein the ratio of time-durations of the signals emitted by the two transmission sources is equal to 4.

11. A method according to claim 10, wherein the time-duration of the signal emitted by the first source is equal to 16 s and the frequency spectrum of said signal is within the range of 12 to 70 Hz.

12. An invention comprising a first transmission source for emitting a first series of first signals having alternating polarities add containing a predetermined frequency spectrum;
   a second transmission source for emitting a second series of second signals having a constant polarity and having energy levels different from the energy levels of said first signals; and
   means for receiving and recording both series of signals after propagation through a medium to be explored, grouping said first series of recorded signals into pairs having opposite polarities, grouping said second series of recorded signals into pairs having the same polarity as each other and corresponding in transmission time, respectively, to signals in pairs of first group, adding the pairs of said first group, adding the pairs of said second group, and cross correlating the sums produced by each addition with the signal emitted by the corresponding transmission source.

13. A device according to claim 12, wherein the receivers are disposed in at least two separate lines which form extensions of each other but the adjacent ends of which are separated by an interval greater than the distance between two consecutive receivers.

14. A device according to claim 13, wherein the interval is of the order of 450 m.

15. A device according to claim 13, wherein the first transmission source is located at the center of the interval.

16. A device according to claim 12, wherein the second transmission source is separated from the first transmission source by a distance equal to 1400 m.

17. A device according to claim 12, wherein the lead pitches of the two transmission sources are equal.

18. A device according to claim 12, wherein the lead pitches of the two transmission sources are different, the lead pitches of the second source being double the lead pitch of the first transmission source.

19. A device according to claim 12, wherein the first source is constituted by at least two synchronous transmitters.

20. A device according to claim 19, wherein the transmitters are vibrators.

21. A device according to claim 20, wherein the vibrators each emit long signals having a frequency spectrum within the range of 12 to 70 Hz and having a time-duration within the range of 4 to 26 s.

22. A device according to claim 21, wherein the time-duration of each signal emitted by the first transmission source is equal to 16 s, whilst the time-duration of each signal emitted by the second source is equal to 4 s.

23. A device according to claim 12, wherein the second transmission source is constituted by a single transmitter which is synchronous with the transmitters of the first transmission source.

24. A device according to claim 12 wherein said two transmission sources are separated by a distance sufficient to enable a set of traces to be produced by one of said sources without interfering with a set of traces produced by the other of said sources.

* * * * *